Patented Jan. 13, 1942

2,270,135

UNITED STATES PATENT OFFICE 2,270,135

PRODUCTION OF ISOMERIC TRIOXY-
METHYLENE

Louis A. Mikeska, Westfield, and Erving Arundale, Union, N. J., assignors to Standard Oil Development Company, a corporation of Delaware No Drawing. Application October 7, 1939,
Serial No. 298,518

13 Claims. (Cl. 260—340)

This invention relates to a process for the conversion of trioxymethylene (a polymeric modification of formaldehyde) into an isomer having distinctly different physical characteristics. Trioxymethylene is a compound of indefinite structure, melting at 171–172° C., and which is insoluble in alcohol, ether, and other organic solvents and is only slightly soluble in water. The isomer ($C_3H_6O_3$) of trioxymethylene, made in accordance with this invention, forms definite needle shaped crystals, has a melting point of 60–61° C., and is soluble in water, alcohol, ether, chloroform, and other organic solvents.

This isomer is of considerable importance in that it is the only anhydrous form of formaldehyde which is completely soluble in organic solvents. It is therefore useful in reactions, such as the formation of unsaturated alcohols from tertiary olefins and formaldehyde (as described in copending application No. 302,122 filed October 31, 1939), where the reaction rate depends on the solubility of the aldehyde.

A higher polymer ($C_4H_8O_4$) of formaldehyde, which has a melting point of 112° C. and is also soluble in water and organic solvents, is formed as a by-product of this isomerization reaction.

Alpha-trioxymethylene has been made previously by heating dry trioxymethylene to 115° C. in a sealed tube (Ber. 17, R. 567 (1884)). When made in this manner, the isomer is little more than a laboratory curiosity because the yields by this process are poor.

It has now been discovered that trioxymethylene can be converted to its isomeric form in good yields by suspending the trioxymethylene in an organic solvent and contacting it with a volatile metallic halide catalyst at an elevated temperature. Metallic halides capable of catalyzing this isomerization include boron fluoride, stannic chloride, aluminum chloride, silicon tetrachloride, titanium tetrachloride, and the like. These catalysts should be present in an amount by weight equal to at least one-tenth of the weight of the trioxymethylene used. Larger amounts are preferable; smaller amounts seriously impair the yield of the isomer. Chloroform is the preferred solvent, although other inert solvents, such as carbon tetrachloride, methylene chloride, ethylene dichloride, and the like, may be used. The solvent should be present in an amount by weight at least equal to four times the weight of the trioxymethylene. However, larger amounts of solvent materially improve the isomer yield. Unreacted trioxymethylene may be separated from the reaction mixture by filtration and contacted with fresh solvent in the absence of additional catalyst to produce more of the isomer. The reaction takes place at room temperature but, for best yields, the temperature of the reaction mixture should be at least 60° C. Higher temperatures, up to 150 C., improve the yield further, but the use of such temperatures is limited by the boiling point of the solvent employed unless the reaction is carried out under pressure. This invention is adapted to be manipulated either as a batch or continuous process but the latter method is to be preferred. The isomers produced by the process described are useful in applications where a soluble and anhydrous form of formaldehyde is desired.

The following examples are given as illustrating but not in any way limiting the invention:

Example 1

240 grams of trioxymethylene were placed in a flask equipped with a stirrer and reflux condenser. 1.2 liters of chloroform containing 67 grams of fuming stannic chloride were then added and the mixture was stirred and heated at 60° C. for 1¾ hours. The mixture was then cooled and filtered. The precipitate weighed 251 grams. The filtrate was treated with dilute carbonate solution and then steam distilled. The two layers present in the distillate were separated and the chloroform layer was dried and then distilled. The chloroform was distilled off up to 62 C. and the residue, on chilling, yielded 29 grams of the isomer.

Example 2

The unreacted trioxymethylene-catalyst complex from Example 1 weighing 251 grams was placed in a flask equipped with a stirrer and reflux condenser. 1.2 liters of chloroform were added and the mixture was again contacted at 60° C. The same method of isolation was employed as in Example 1. 21 grams of isomer were obtained. The unreacted trioxymethylene from this reaction may be contacted with more solvent until the trioxymethylene is consumed or the reaction may be carried out in a continuous manner by recycling the solvent.

Example 3

240 grams of trioxymethylene were placed in a flask equipped with a stirrer and a reflux condenser. 600 cc. of chloroform were then poured in and the mixture was stirred while 34 grams of anhydrous aluminum chloride were added. The milky mixture was stirred and heated at 62° C. for 23 hours. The mixture was then cooled and filtered. The unreacted trioxymethylene, after water washing, weighed 158 grams. The filtrate was treated with dilute sodium carbonate solution and then steam distilled. The two layers present in the distillate were separated and the chloroform layer was dried and then distilled. The chloroform was removed up to 62° C. and the residue, on chilling, yielded 22 grams of isomer. Larger amounts of catalyst and chloroform improve the yield.

*Example 4*

30 cc. of fuming stannic chloride were dissolved in 2 liters of chloroform and the resulting solution was placed in a flask equipped with a stirrer and reflux condenser. 240 grams of trioxymethylene were then added and the mixture was stirred and heated to 62° C. A portion of the mixture was siphoned off from time to time thru a filter and the chloroform was distilled from the filtrate and returned to the reactor. The distillation residue was accumulated. After four hours the recycling of the chloroform was discontinued and the reaction mixture was cooled. The unreacted trioxymethylene was separated from the reaction mixture by filtration; it weighed 273 grams before and 162 grams after water washing. The chloroform filtrate was added to the residue mentioned above and the mixture was neutralized with a small amount of dilute sodium carbonate solution, dried, filtered, and the chloroform was then removed by distillation. The distillation residue was chilled and 45 grams of the isomer were obtained.

What is claimed is:

1. The method of producing isomeric trioxymethylene which comprises contacting trioxymethylene with a catalyst selected from the group consisting of volatile metallic halides and volatile halides of boron and silicon dissolved in an inert organic solvent.

2. The method of producing isomeric trioxymethylene which comprises contacting trioxymethylene with a catalyst selected from the group consisting of volatile metallic halides and volatile halides of boron and silicon dissolved in an inert organic solvent, separating the unreacted trioxymethylene and recovering the isomeric trioxymethylene from the solvent by first neutralizing the mixture and then removing the solvent by distillation or evaporation.

3. The method of producing isomeric trioxymethylene which comprises contacting trioxymethylene with stannic chloride dissolved in an inert organic solvent.

4. The method of producing isomeric trioxymethylene which comprises contacting trioxymethylene with aluminum chloride dissolved in an inert organic solvent.

5. The method of producing isomeric trioxymethylene which comprises contacting trioxymethylene with silicon tetrachloride dissolved in an inert organic solvent.

6. The method of producing isomeric trioxymethylene which comprises contacting trioxymethylene with fuming stannic chloride dissolved in an inert organic solvent.

7. The method of producing isomeric trioxymethylene which comprises contacting trioxymethylene with a catalyst selected from the group consisting of volatile metallic halides and volatile halides of boron and silicon dissolved in chloroform.

8. The method of producing isomeric trioxymethylene which comprises heating trioxymethylene while in contact with a catalyst selected from the group consisting of volatile metallic halides and volatile halides of boron and silicon dissolved in an inert organic solvent, separating the unreacted trioxymethylene-catalyst complex by filtration and recontacting said complex with fresh solvent.

9. The method of producing isomeric trioxymethylene which comprises contacting a trioxymethylene-catalyst complex resulting from the contact of trioxymethylene with one of the group consisting of volatile metallic halides and volatile halides of boron and silicon with chloroform and isolating the isomeric trioxymethylene.

10. The method of producing isomeric trioxymethylene which comprises heating trioxymethylene at temperatures above 60° C. under pressure while in contact with a catalyst selected from the group consisting of volatile metallic halides and volatile halides of boron and silicon dissolved in chloroform and isolating the isomeric trioxymethylene.

11. The method of producing isomeric trioxymethylene which comprises heating a mixture of trioxymethylene and a catalyst selected from the group consisting of volatile metallic halides and volatile halides of boron and silicon dissolved in an inert organic solvent to a temperature between 60–150° C., separating the unreacted trioxymethylene and recovering the isomeric trioxymethylene.

12. The method of producing isomeric trioxymethylene which comprises heating under pressure a mixture of trioxymethylene and fuming stannic chloride dissolved in chloroform to a temperature between 60–150° C., cooling and filtering the mixture. neutralizing the filtrate with alkali and subjecting the neutralized filtrate to steam distillation, separating the chloroform layer in the distillate from the water layer and recovering the isomeric trioxymethylene as a residue from the chloroform layer by removing the chloroform by distillation.

13. The method of producing isomeric trioxymethylene which comprises heating a mixture of 240 parts of trioxymethylene and 67 parts of fuming stannic chloride dissolved in 1200 parts of chloroform to a temperature of 60° C., cooling and filtering the mixture, neutralizing the filtrate with dilute carbonate solution and subjecting the neutralized filtrate to steam distillation, separating the chloroform layer in the distillate from the water layer and recovering the isomeric trioxymethylene as a residue from the chloroform layer by removing the chloroform by distillation.

LOUIS A. MIKESKA.
ERVING ARUNDALE.